Jan. 24, 1956

G. H. JONES 2,731,833

WHEEL BALANCER

Filed June 8, 1953

INVENTOR.
GRANVIL H. JONES

BY

Knox & Knox

AGENTS FOR APPLICANT

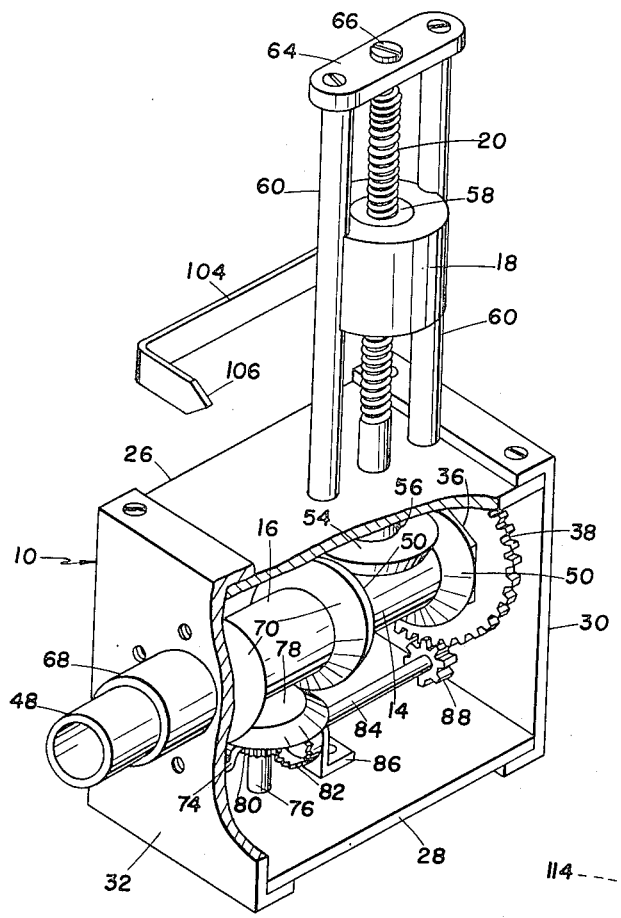

United States Patent Office 2,731,833
Patented Jan. 24, 1956

2,731,833

WHEEL BALANCER

Granvil Henry Jones, San Diego, Calif.

Application June 8, 1953, Serial No. 360,287

8 Claims. (Cl. 73—458)

The present invention relates generally to the balancing of rotating bodies and more particularly to a wheel balancer for checking the balance of automobile wheels or the like.

Many types of wheel balancing machines in present use are operated in such a way that various weights must be added to the wheel being checked and the wheel rotated to ascertain the effect of the added weight. The process is often repeated several times on a single wheel, the position and mass of the weight being changed until the required results are obtained. The operation is time consuming and entails a considerable amount of trial and error. It is the purpose of this invention to provide a wheel balancer which reduces the balancing of a wheel to a single operation and eliminates the necessity of adding weights to the wheel until the operation is completed. The necessary correction weight and means for adjusting the weight are enclosed within the balance tester, which is also provided with indicating means to show the off balance condition of the wheel and the corrective measures necessary to rectify this condition.

The primary object of this invention is to provide a wheel balancer comprising a portable unit which is attached directly to the wheel and rotates therewith, the unit having an adjustable correction weight to compensate for imperfect balance of the wheel.

Another object of this invention is to provide a wheel balancer in which the weight may be adjusted to show the amount of weight and the position of the weight required to balance the wheel.

Another object of this invention is to provide a wheel balancer having convenient manual controls with which to adjust the balance weight while the wheel is rotating.

Another object of this invention is to provide a wheel balancer having a graduated indicating dial so that the weight and its position may be visually determined directly on the wheel.

Another object of this invention is to provide a wheel balancer which is adapted for fabrication from many different materials, so that the choice of material can be according to the dictates of availability and price considerations, the exact sizes and proportions being matters easily determined to suit particular conditions and needs.

Another object of this invention is to provide a wheel balancer which is inexpensive and practicable to manufacture.

Finally, it is an object to provide a wheel balancer of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings, which form a material part of this disclosure and wherein similar characters of reference indicate similar or identical elements and portions throughout the specification and throughout the views of the drawings, and in which:

Fig. 4 is a sectional view taken on the line 4—4 of Fig. 2.

Fig. 5 is an isometric view of the mechanism of the device with the outer cover removed.

Fig. 6 is a diagrammatic view of the device attached to a wheel in position for the balancing operation.

Figures 1, 2, 3:
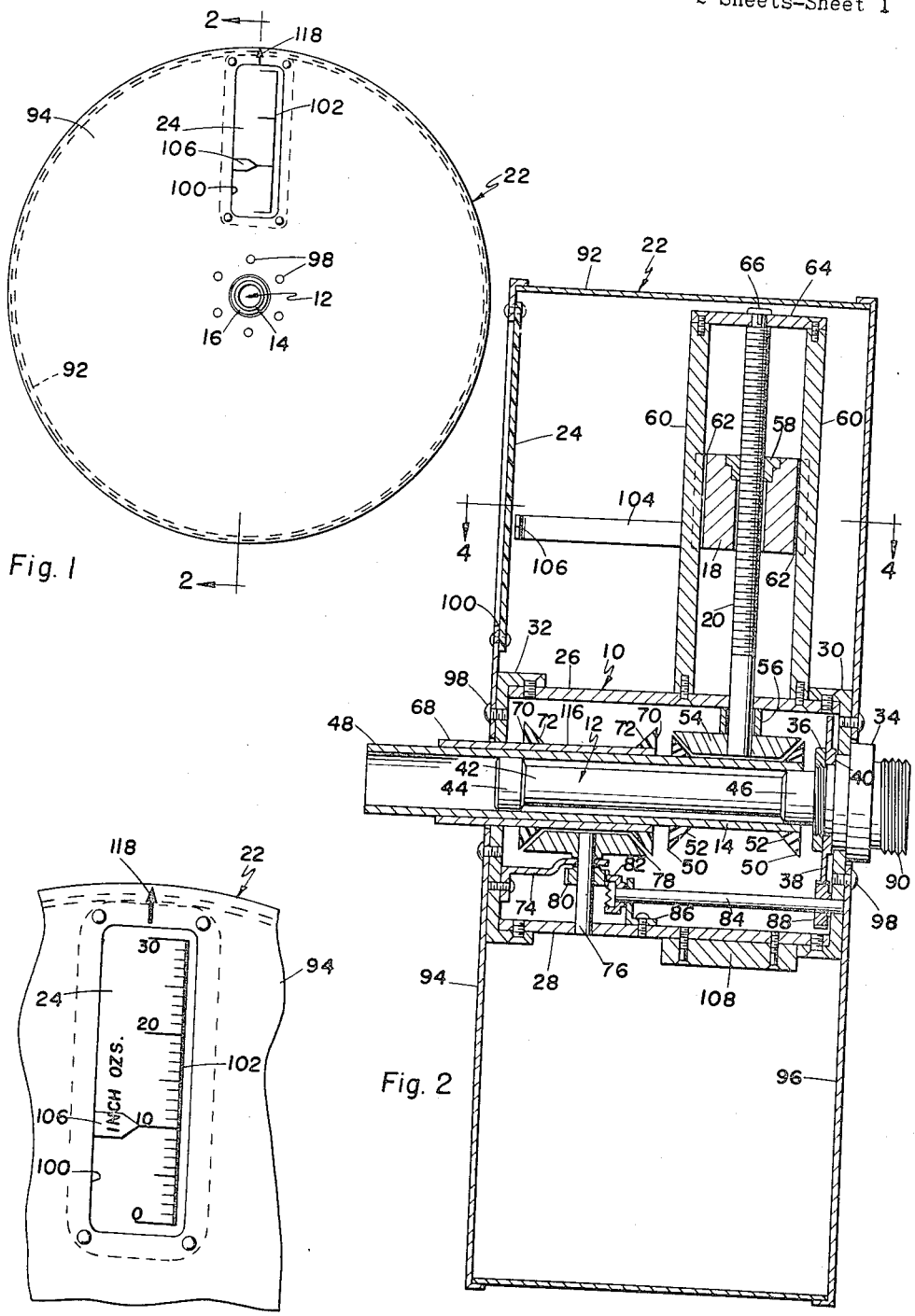
Fig. 1 is a front elevation view of the wheel balancer.
Fig. 2 is an enlarged vertical sectional view taken on the line 2—2 of Fig. 1.
Fig. 3 is an enlarged fragmentary elevation view showing the indicator dial.

Referring now to the drawing, the wheel balancer comprises, briefly, a housing 10 having therein a center shaft 12, an inner sleeve 14 slidable on the center shaft and an outer sleeve 16 slidable on the inner sleeve. On one side of the housing is a correction weight 18 mounted on a screwed shaft 20, the position of the correction weight being adjusted by manipulation of the inner sleeve 14. The mechanism is enclosed in a cover 22 which is provided with an indicator dial 24.

The housing 10 comprises an upper plate 26, and a lower plate 28, joined at one end by an end plate 30 and at the other end by an end plate 32, the structure constituting a substantially rectangular box open on both sides. The center shaft 12 is rotatably mounted in the end plate 30 and is retained by a flange 34 on the outer side and a nut 36 screwed onto said shaft inside the housing 10. The nut 36 also serves to hold a gear 38 firmly against the shoulder 40 on the shaft 12 adjacent the end plate 30, said gear being locked against rotation relative to said shaft. The shaft 12 extends across the housing 10 and is reduced in diameter for a portion of its length as indicated at 42, so providing a short bearing plug 44 at its outer end and a shank 46 at the end adjacent the nut 36.

The inner sleeve 14 is slidably mounted on the bearing plug 44 and the shank 46, said inner sleeve extending from the end of the housing 10 as indicated at 48. The inner sleeve 14 is fitted with a pair of spaced drive collars 50 having inwardly disposed bevelled faces 52. The screwed shaft 20 extends into the housing 10 through the upper plate 26 and is fitted with a driving disc 54 which fits between the drive collars 50 and is bevelled to correspond with the bevelled faces 52. The driving disc 54 is spaced from the upper plate 26 by a spacer 56. The correction weight 18 has a threaded bushing 58 which engages the screwed shaft 20, said correction weight sliding between guide rods 60 positioned on either side thereof. The guide rods 60 are fastened to the upper plate 26 and fit in grooves 62 in the correction weight 18, said guide rods being held at their outer ends by a spacer bar 64. The end of the screwed shaft 20 is journalled in the spacer bar 64 and is retained by a screw 66.

The outer sleeve 16 is slidable on the inner sleeve 14 and extends from the housing 10 as indicated at 68, the end 48 of said inner sleeve protruding beyond the end 68. The outer sleeve is fitted with a pair of spaced drive collars 70 having inwardly disposed bevelled edges 72.

Below the outer sleeve 16 is a bracket 74 attached to the end plate 32, said bracket supporting a stub shaft 76, the other end of which is journalled in the lower plate 28. The stub shaft 76 has on its upper end a driving disc 78 which fits between the drive collars 70 and is bevelled to correspond with the bevelled faces 72. Also secured to the stub shaft 76 below the bracket 74 is a pinion 80. This pinion 80 is engaged with a crown gear 82 which is secured to a shaft 84 supported at one end by a bracket 86 and journalled at the other end in the end plate 30. The shaft 84 is also fitted with a pinion 88 which engages the gear 38 on the center shaft 12.

The end of the center shaft 12 protruding beyond the end plate 30 is screw threaded as indicated at 90 so that the device may be attached to the wheel being balanced.

The cover 22 comprises a substantially cylindrical casing 92 which is enclosed by a front plate 94 and a back plate 96, said front plate and back plate being secured to the end plates 30 and 32 respectively by means of screws 98. The front plate 94 is provided with an aperture 100 over which is fitted the transparent indicator dial 24. This dial 24 is inscribed or imprinted with a graduated scale 102 in suitable units such as inch ounces. An indicator arm 104 is secured to the correction weight 18, said indicator arm having an inwardly bent pointer 106 which is aligned with the scale 102.

The mechanism is balanced by means of a counterweight 108 secured to the lower plate 28, the mass of the counterweight being such that the complete unit is statically balanced when the pointer 106 is at zero on the scale 102.

In order to balance a wheel, the device is fastened to a suitable bracket 110 by means of a nut 112 screwed onto the threaded end 90 of the shaft 12. The bracket 110 is then bolted to the wheel 114, shown dotted in Fig. 6, by means of the existing wheel attachment bolts 116, the wheel being on the driven axle of the car. The car is jacked up so that the wheel may rotate and the motor is started. The motor is accelerated until the vibration of the wheel is most evident, this speed being the critical or "resonant" speed of the wheel. The correction weight 18 is, of course, set so that the pointer is at zero on the scale 102.

It has been found in practice that the wheel vibration is more noticeable if the car is jacked up by the bumper so that the wheel is suspended freely from its springs.

The wheel balancer is first adjusted to move the correction weight 18 outwardly on the screwed shaft 20. This is accomplished by grasping the inner sleeve extension 48 between the fingers, as shown in Fig. 6, to stop the rotation of the sleeve. The inner sleeve 14 is then moved axially until one of the drive collars 50 engages the driving disc 54. Continued rotation of the remainder of the mechanism around the inner sleeve 14 while the drive collar 50 and the driving disc 54 are frictionally engaged will thus cause the screwed shaft 20 to rotate and move the correction weight 18 axially thereon. The direction of axial movement of the inner sleeve 14 is obviously governed by the direction of rotation of the wheel 114, the drive collars 50 selectively adjusting the correction weight 18 inwardly or outwardly as they engage the driving disc 54.

Movement of the correction weight outwardly causes the wheel balancer to be thrown off balance. The wheel balancer is then orientated in relation to the wheel 114 in order to compensate for the incorrect balance of the wheel. This is accomplished by axial movement of the outer sleeve 16 in a similar manner to the adjustment of the inner sleeve 14. As the outer sleeve 16 is adjusted, one of the drive collars 70 will be brought into contact with the driving disc 78. Continued rotation of the mechanism around the outer sleeve 16 will thus cause rotation of the pinion 80, which, through the crown gear 82 and shaft 84, will rotate the pinion 88 around the gear 38. This gear 38, being secured to the center shaft 12, continues to revolve with the wheel 114, thus the entire mechanism is orientated relative to said wheel.

The wheel balancer is orientated in this way until the wheel vibration decreases, at which point, the axis of the correction weight 18 will be radially aligned with the lighter, or off balance, portion of the wheel 114. For convenience, an arrow head 118 or similar suitable demarcation is provided near the rim of the front plate 94 in axial alignment with the screwed shaft 20, this arrow head 118 thus indicating the position on the rim of the wheel at which a weight is required to balance the wheel. As soon as the wheel balancer has been orientated to determine the position of the required balance weight, the correction weight 18 is once more adjusted by means of the inner sleeve 14 until the wheel vibration is eliminated.

The engine is then shut off and the rotation of the wheel is stopped. The position of the required balance weight may then be determined from the arrow head 118, while the actual mass of the required weight may be obtained from the position of the pointer 106 against the scale 102. As illustrated in Fig. 3, this scale is graduated in inch ounces, the weight being found by calculation or by reference to a suitable table after determining the radius of the wheel rim on which the weight is to be secured.

After one wheel has been balanced, the remaining wheels may be attached to the driven axle of the car and balanced in the same manner. It will be seen that the method eliminates the necessity of repeated starting and stopping of wheel rotation and the subsequent use of a number of balance weights at various positions on the wheel rim. The wheel balancer is extremely compact and self contained and has few moving parts, so reducing cost of manufacture and increasing the utility of the device.

Although the wheel balancer has been described in use with the wheels of an automobile, its utility is by no means limited to such an operation. The device may be fitted to conventional types of pedestal wheel balancers in present use, or may be used to determine the balance of rotating bodies other than wheels. A particular example of this latter use is when the device is attached to a machine tool shop balancing machine such as the Akimoff (trade name) type.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A wheel balancer comprising a center shaft, a housing rotatably mounted on said center shaft, a screwed shaft rotatably mounted in said housing and extending radially of said center shaft, a correction weight threadedly engaged on said screwed shaft, guide means fixedly mounted on said housing, said guide means locking said correction weight against rotation, an inner sleeve rotatable and axially slidable on said center shaft, a pair of spaced drive collars fixed on said inner sleeve, a driving disc fixed to said screwed shaft, said driving disc being between and spaced from said drive collars, whereby said inner sleeve may be slid in either direction to cause the drive collars to engage selectively with said driving disc, and means for rotating said housing relative to said center shaft.

2. A wheel balancer comprising a center shaft, a housing rotatably mounted on said center shaft, a screwed shaft rotatably mounted in said housing and extending radially of said center shaft, a correction weight threadedly engaged on said screwed shaft, guide means fixedly mounted on said housing, said guide means locking said correction weight against rotation, an inner sleeve rotatable and axially slidable on said center shaft, a pair of spaced drive collars fixed on said inner sleeve, a driving disc fixed to said screwed shaft, said driving disc being between and spaced from said drive collars, an outer sleeve rotatably and axially slidable on said inner sleeve, a second pair of spaced drive collars fixed on said outer sleeve, a second driving disc rotatably mounted between and spaced from said second drive collars, whereby said outer sleeve may be slid in either direction to cause the second drive collars to engage selectively with said second driving disc, and gear means interconnecting said second driving disc and said housing whereby said housing may be rotated relative to said center shaft.

3. A wheel balancer comprising a center shaft, a housing rotatably mounted on said center shaft, a screwed shaft rotatably mounted in said housing and extending radially of said center shaft, a correction weight threadedly engaged on said screwed shaft, guide means fixedly mounted on said housing, said guide means locking said correction weight against rotation, an inner sleeve rotatable and axially slidable on said center shaft, a pair of spaced drive collars fixed on said inner sleeve, a driving disc fixed to said screwed shaft, said driving disc being between and spaced from said drive collars, an outer sleeve rotatably and axially slidable on said inner sleeve, a second pair of spaced drive collars fixed on said outer sleeve, a stub shaft rotatably mounted in said housing radially spaced from said outer sleeve, a second driving disc secured to said stub shaft, said second driving disc being between and spaced from said second drive collars, a gear secured to said center shaft, and gear means operatively connecting said second driving disc with said gear.

4. A wheel balancer comprising a center shaft, a housing rotatably mounted on said center shaft, a screwed shaft rotatably mounted in said housing and extending radially of said center shaft, a correction weight threadedly engaged on said screwed shaft, guide means fixedly mounted on said housing, said guide means locking said correction weight against rotation, an inner sleeve rotatable and axially slidable on said center shaft, a pair of spaced drive collars fixed on said inner sleeve, a driving disc fixed to said screwed shaft, said driving disc being between and spaced from said drive collars, an outer sleeve rotatably and axially slidable on said inner sleeve, said outer sleeve protruding from said housing, and said inner sleeve protruding from said outer sleeve, a second pair of spaced drive collars fixed on said outer sleeve, a stub shaft rotatably mounted in said housing radially spaced from said outer sleeve, a second driving disc secured to said stub shaft, said second driving disc being between and spaced from said second drive collars, a gear secured to said center shaft, and gear means operatively connecting said second driving disc with said gear.

5. A wheel balancer comprising a center shaft, a housing rotatably mounted on said center shaft, a screwed shaft rotatably mounted in said housing and extending radially of said center shaft, a correction weight threadedly engaged on said screwed shaft, guide means fixedly mounted on said housing, said guide means locking said correction weight against rotation, an inner sleeve rotatable and axially slidable on said center shaft, a pair of spaced drive collars fixed on said inner sleeve, a driving disc fixed to said screwed shaft, said driving disc being between and spaced from said drive collars, an outer sleeve rotatably and axially slidable on said inner sleeve, said outer sleeve protruding from said housing, and said inner sleeve protruding from said outer sleeve, a second pair of spaced drive collars fixed on said outer sleeve, a stub shaft rotatably mounted in said housing radially spaced from said outer sleeve, a second driving disc secured to said stub shaft, said second driving disc being between and spaced from said second drive collars, a gear secured to said center shaft, gear means operatively connecting said second driving disc with said gear, and a cover fixedly mounted on said housing and enclosing the housing and said correction weight.

6. A wheel balancer according to claim 5 wherein said cover is provided with an aperture, a graduated dial in said aperture, and an indicating pointer secured to said correction weight and aligned with said dial.

7. A wheel balancer according to claim 2 wherein said center shaft is provided with a screw threaded end for attachment to a supporting bracket.

8. A wheel balancer according to claim 2 wherein said drive collars and said second drive collars are bevelled on the inner edges thereof, said driving disc and said second driving disc being bevelled to conform to said drive collars and said second drive collars respectively.

References Cited in the file of this patent

UNITED STATES PATENTS

| | | |
|---|---|---|
| 1,296,732 | Akimoff | Mar. 11, 1919 |
| 1,401,838 | Volet | Dec. 27, 1921 |
| 1,876,526 | Thearle et al. | Sept. 6, 1932 |
| 2,241,637 | Ernst | May 13, 1941 |
| 2,662,396 | Hunter | Dec. 15, 1953 |